(12) United States Patent
Newcomb et al.

(10) Patent No.: US 12,012,150 B2
(45) Date of Patent: Jun. 18, 2024

(54) STRUCTURAL PANORAMIC WINDSHIELD AND ROOF

(71) Applicant: GM GLOBAL TECHNOLOGY OPERATIONS LLC, Detroit, MI (US)

(72) Inventors: Bradley Allen Newcomb, Troy, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/825,041

(22) Filed: May 26, 2022

(65) Prior Publication Data

US 2023/0382199 A1 Nov. 30, 2023

(51) Int. Cl.
*B62D 25/06* (2006.01)
*B60J 1/02* (2006.01)
*B60J 3/02* (2006.01)
*B60J 3/04* (2006.01)
*B60J 7/043* (2006.01)

(52) U.S. Cl.
CPC ............... *B62D 25/06* (2013.01); *B60J 1/02* (2013.01); *B60J 3/0234* (2013.01); *B60J 3/04* (2013.01); *B60J 7/043* (2013.01)

(58) Field of Classification Search
CPC ... B60J 1/002; B60J 1/004; B60J 1/006; B60J 1/007; B60J 1/02; B60J 3/007; B60J 3/0204; B60J 3/0213; B60J 3/0234
USPC ..... 296/84.1, 96.12, 96.21, 210, 215, 23.01, 296/2, 3, 97.4, 97.9, 97.11
See application file for complete search history.

(56) References Cited

U.S. PATENT DOCUMENTS

| | | | | |
|---|---|---|---|---|
| 5,031,952 A | * | 7/1991 | Miyamoto | B60J 3/0204 296/97.4 |
| 11,267,514 B2 | | 3/2022 | Aitharaju et al. | |
| 11,358,647 B1 | | 6/2022 | Newcomb et al. | |
| 11,420,683 B2 | | 8/2022 | Newcomb et al. | |
| 2007/0182217 A1 | * | 8/2007 | Saleen | B62D 25/06 296/215 |

FOREIGN PATENT DOCUMENTS

| | | | | |
|---|---|---|---|---|
| CN | 207173741 U | * | 4/2018 | |
| EP | 1273470 B1 | * | 11/2006 | ............... B60J 10/82 |
| EP | 1859975 A2 | * | 11/2007 | ................ B60J 1/02 |
| EP | 1853445 B1 | * | 5/2013 | ....... B32B 17/10036 |
| KR | 473158 Y1 | * | 6/2014 | ............ B60J 3/0278 |
| WO | WO-02072408 A1 | * | 9/2002 | ....... B32B 17/10045 |

(Continued)

OTHER PUBLICATIONS

Translation KR200473158 (Year: 2014).*

(Continued)

*Primary Examiner* — Dennis H Pedder (57) ABSTRACT

A windshield and roof system of a vehicle includes: a windshield that includes glass and that is transparent; a front cross-member that extends laterally between A-pillars of the vehicle, that is disposed rearward of the windshield, and that has a thickness in a longitudinal direction of the vehicle of less than 50 millimeters (mm); and a roof portion that is transparent, that is located rearward of the windshield, where the windshield and the roof portion are joined with the front cross-member.

15 Claims, 10 Drawing Sheets

(56) References Cited

FOREIGN PATENT DOCUMENTS

WO     WO-2008040892 A1 *   4/2008

OTHER PUBLICATIONS

Translation CN207173741 (Year: 2017).*
Translation of EP1853445 (Year: 2006).*
Translation of EP859975 (Year: 2006).*
Dupont document https://www.dupont.com/what-is-kevlar.html#:~:text=The%20chemical%20structure%20of%20Kevlar,on%20an%20equal%20weight%20basis.&text=Kevlar%C2%AE%20fibers%20are%20so,nearly%20impossible%20to%20separate%20them. (Year: 2022).*
U.S. Appl. No. 17/141,478, filed Jan. 5, 2021, Newcomb et al.
U.S. Appl. No. 17/141,524, filed Jan. 5, 2021, Newcomb et al.
U.S. Appl. No. 17/226,232, filed Apr. 9, 2021, Newcomb et al.
U.S. Appl. No. 17/406,023, filed Aug. 18, 2021, Newcomb et al.
U.S. Appl. No. 17/406,024, filed Aug. 18, 2021, Newcomb et al.
U.S. Appl. No. 17/584,557, filed Jan. 26, 2022, Newcomb et al.
U.S. Appl. No. 17/667,260, filed Feb. 8, 2022, Newcomb et al.
U.S. Appl. No. 17/699,696, filed Mar. 21, 2022, Newcomb et al.

* cited by examiner

STRUCTURAL PANORAMIC WINDSHIELD AND ROOF

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle windshields and roofs and more particularly to structural panoramic windshields and roofs of vehicles.

Vehicle upper body assemblies provide structural support and mounting locations for other vehicle components. It is advantageous to improve the strength and structural performance of vehicle upper body assemblies. However, it is also advantageous that components in automobiles or other vehicles to be lightweight to improve efficiency. Furthermore, it is advantageous that components of a structural assembly be at least partially transparent to improve occupant visibility and/or aesthetics. Thus, vehicle components in structural assemblies that exhibit adequate strength during normal service, while minimizing component weight and increasing occupant visibility are advantageous.

SUMMARY

In a feature, a windshield and roof system of a vehicle includes: a windshield that includes glass and that is transparent; a front cross-member that extends laterally between A-pillars of the vehicle, that is disposed rearward of the windshield, and that has a thickness in a longitudinal direction of the vehicle of less than 50 millimeters (mm); and a roof portion that is transparent, that is located rearward of the windshield, where the windshield and the roof portion are joined with the front cross-member.

In further features, the roof portion includes electrochromic tinting at one or more locations, and where the system further includes a power control module that selectively applies power to the electrochromic tinting.

In further features, the roof portion and the windshield are adhered to the front cross-member using an adhesive.

In further features, the adhesive is polyurethane.

In further features, the front cross-member is made of one of a metal and a composite material.

In further features, at least one of the roof portion and the windshield is fixed to the front cross-member by fasteners.

In further features, sun visors are fixed and are at least partially disposed vertically below the front cross-member.

In further features, tracks extend in a longitudinal direction of the vehicle, and the sun visors are configured to translate via the tracks.

In further features, a lateral member extends laterally, and the sun visors are fixed to the lateral member.

In further features, a handle is coupled to the lateral member.

In further features, one or more electric motors are configured to translate the sun visors along the tracks.

In further features, a rear cross-member extends laterally between B-pillars of the vehicle and is disposed rearward of the roof portion.

In further features, a roof that is disposed rearwardly of the rear cross-member.

In further features, the roof portion includes one of glass, a metal, and a composite material.

In further features, the roof portion includes one of glass and a composite material.

In a feature, a windshield and roof system of a vehicle includes: a windshield that includes glass and that is transparent; and a roof portion that is transparent, that is located rearward of the windshield, and that includes reinforcing fibers, and that is joined with the roof portion, where the vehicle does not include a front cross-member that extends laterally between A-pillars of the vehicle and that is disposed between the windshield and the roof portion.

In further features, the roof portion includes electrochromic tinting at one or more locations, and the system further includes a power control module that selectively applies power to the electrochromic tinting.

In further features, the roof portion is adhered to the windshield using an adhesive.

In further features, the roof portion is made of a composite material.

In further features, the reinforcing fibers include one of carbon fibers, basalt fibers, glass fibers, liquid crystal spun fibers, and flax fibers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a front windshield through which a driver looks when driving in a forward direction of the vehicle. Some vehicles include a panoramic sunroof through which passengers can look vertically. Vehicles with panoramic sunroofs include a large structural cross-member (a front header) that provides structural integrity, such as in the event of a vehicle rollover event. A vertical top portion of the windshield and a front most portion of the sunroof connect to the structural cross-member. The cross-member spans the vehicle between A-pillars of the vehicle.

The cross-member, however, obstructs forward visibility to the driver and therefore lowers a visibility rating (or score) of the vehicle.

The present application involves a minimally sized or omitted cross-member to increase forward visibility and therefore increase visibility rating. Sun visors that may be disposed near or at the cross-member may be translatable forward and backward. Movement of the sun visors backward (toward a rear of the vehicle) also increases forward visibility. The sunroof may include reinforcing fibers and be structural to allow for the omission of the front cross-member. The omission of the front cross-member increases forward visibility. The minimized cross-member is made possible by the ability to transfer load to the roof as opposed to needing to put the load through the cross-member.

Figure 1:
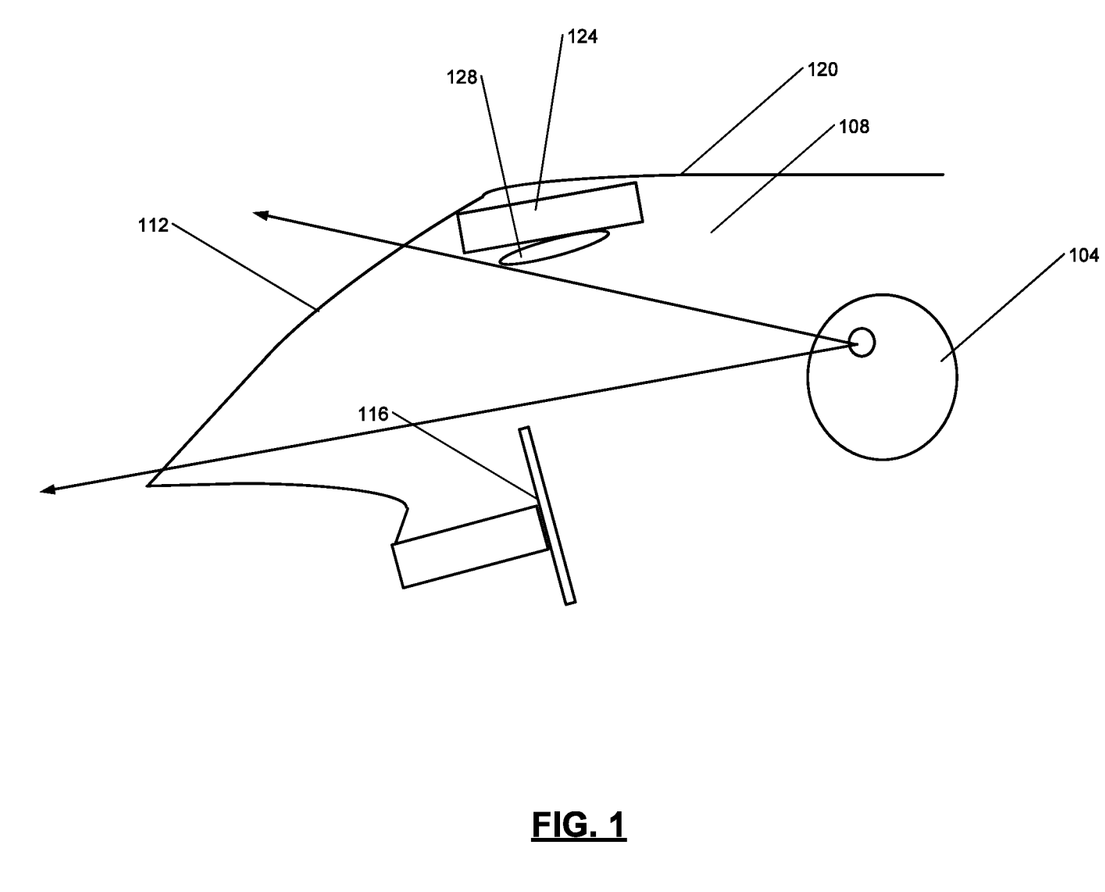
FIG. 1 is a side perspective view of an example portion of a vehicle.

FIG. 1 is a side perspective view of an example portion of a vehicle. A driver 104 sits within a passenger cabin 108 of the vehicle. A (front) windshield 112 is transparent and fills a front windshield opening of the vehicle. The driver 104 looks through the front windshield 112, for example, when driving the vehicle in a forward direction. The driver 104 may steer the vehicle via a steering wheel 116. In various implementations, the steering wheel 116 may be omitted or stowable.

The windshield 112 and a sunroof 120 may be joined to a front cross-member 124 (or front header). The sunroof 120 is also transparent. The front cross-member 124 extends laterally left to right between A pillars of the vehicle. The front cross-member 124 provides structural strength to the roof portion of the vehicle, for example, for vehicle roll over events.

Sun visors 128 may be coupled to or near the front cross-member 124. If the front cross-member 124 is large and bulky (e.g., for structure), a vertical forward visibility of the driver 104, illustrated by the arrows, is limited. The sun visors 128 (bearing one or more air bag information stickers) may not obstruct the forward visibility given the size of the front cross-member 124.

Figure 2:
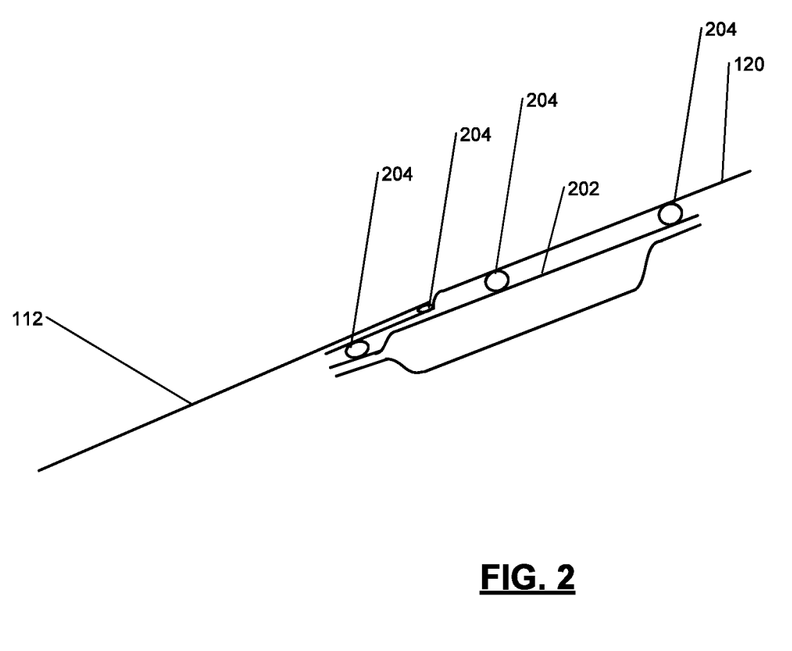
FIG. 2 is a cross-sectional view of an example implementation including a system for greater forward visibility including a smaller front cross-member.

FIG. 2 is a cross-sectional view of an example implementation including a system for larger forward visibility including a smaller (front to back of vehicle wise) front cross-member 202. The front cross-member 202 may be made of, for example, a steel, a composite material, or another suitable type of material. As discussed further below, the front cross-member 202 may be omitted in various implementations. The front cross-member 202 may be a two-piece construction, such as illustrated.

The windshield 112 and the sunroof 120 are shown. The sunroof 120 may include one or more electrochromic portions. An adhesive 204 is used at one or more locations to adhere the windshield 112 and the sunroof 120 to the front cross-member 202. For example, continuous beads of the adhesive 204 may be provided around the opening for the windshield 112 and around the opening of the sunroof 120. The adhesive 204 may also seal and prevent infiltration of water, dust, etc. into the passenger cabin. The adhesive 204 may be, for example, a polyurethane adhesive or another suitable type of adhesive.

Figure 3:
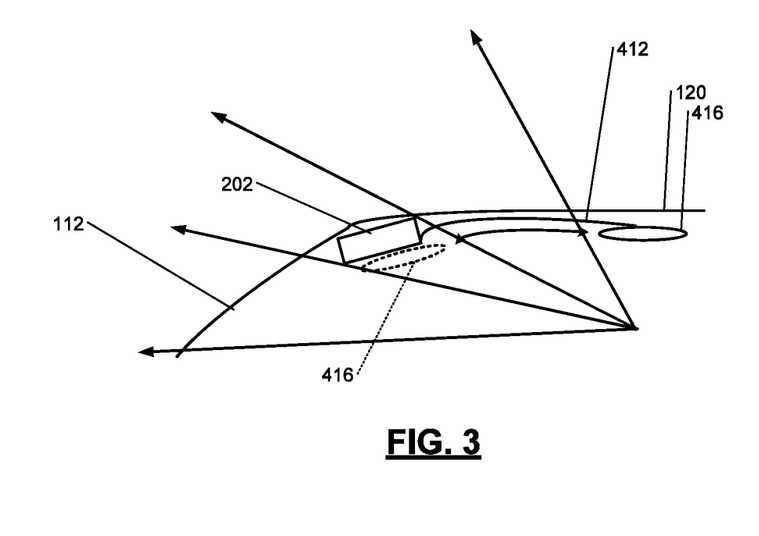
FIGS. 3 and 4 are a side perspective view and a top view of an example windshield and sunroof system.
Figure 4:
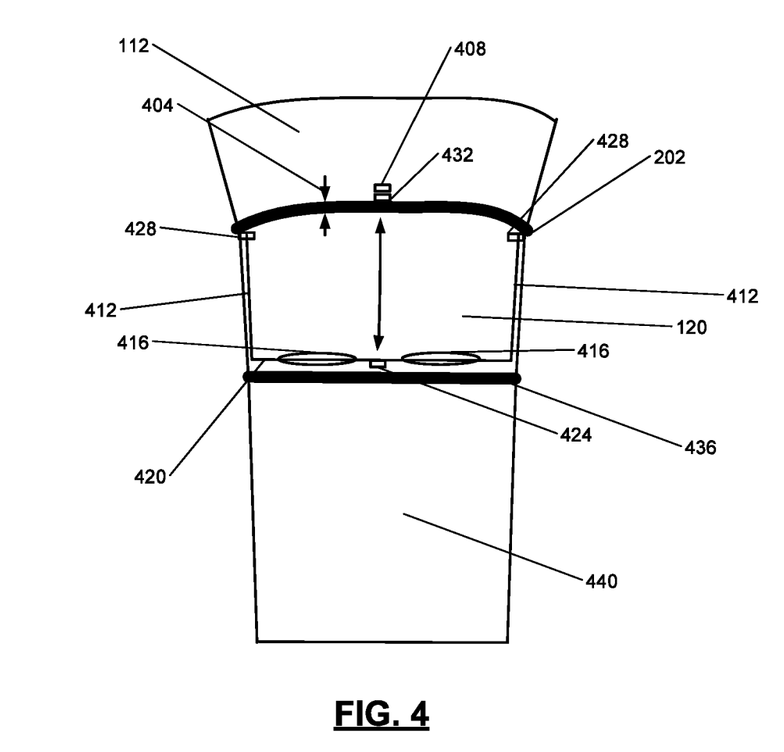

FIGS. 3 and 4 are a side perspective view and a top view of an example windshield and sunroof system. The system includes the smaller front cross-member 202. The windshield 112 may include laminated glass. The windshield 112 may also include one or more other layers, such as a rigid plastic glazing disposed on an inner or outer (relative to the passenger cabin) surface of the windshield 112. The windshield 112 may also include one or more other layers between the laminates of glass.

The front cross-member 202 may be made of a composite material, a metal (e.g., a steel), or another suitable type of material. A front to back distance 404 of the front cross-member 202 is minimized to achieve one or more predetermined structural characteristics. The front to back distance 404 may be, for example, 50 millimeters (mm) or less.

The sunroof 120 is transparent and is a structural component. The sunroof 120 may be made of, for example, laminated glass or a composite material. The sunroof 120 may or may not include one or more electrochromic portions. The electrochromic portion(s) change one or more visual properties when power is applied to the electrochromic portion(s). A power control module 408 may control the application of power to the electrochromic portion(s), such as based on user input (e.g., a request to tint the sunroof) and/or one or more vehicle operating parameters. In various implementations, the power control module 408 may be implemented with an infotainment module of the vehicle.

The vehicle includes tracks 412 that extend longitudinally (front to back) of the vehicle. Sun visors 416 are translatable forward and backward along the tracks 412. For example, the sun visors 416 may be coupled to a lateral bar 420. A handle 424 may be attached to the lateral bar 420. A user (e.g., the driver or a passenger) may translate the sun visors 416 forward and backward via the handle 424. The sun visors 416 may be translatable to a forward most position where the sun visors 416 are at least partially vertically below the front cross-member 202 (e.g., shown in dashed lines in FIG. 3). The sun visors 416 may be translatable to a rearward most position, such as shown in solid lines in FIGS. 3 and 4.

In various implementations, one or more electric motors, such as electric motors 428, may move the sun visors 416 forward and backward along the tracks 412. A motor control module 432 may control the application of power to the electric motors 428 to control movement and positioning of the sun visors 416. The motor control module 432 may control the application of power to the electric motors 428, for example, based on user input (e.g., to move the sun visors 416 forward or backward) and/or one or more vehicle operating parameters. In various implementations, the motor control module 432 may be implemented with an infotainment module of the vehicle.

The windshield 112 and the sunroof 120 may be adhered to the front cross-member 202 via an adhesive (e.g., as in FIG. 2) or via fasteners (e.g., bolts). As illustrated in FIG. 3, the smaller forward cross-member increases forward visibility of the driver.

The sunroof 120 is disposed longitudinally rearward of the front cross-member 202 and the windshield 112. A rear cross-member 436 is disposed longitudinally rearward of the sunroof 120. In various implementations, the rear cross-member 436 may be omitted. The rear cross-member 436 may extend laterally between B-pillars of the vehicle. The rear cross-member 436 may be made of, for example, a composite material or a metal (e.g., a steel). While an example location is shown, the rear cross-member 436 may be located in a different location or omitted.

A roof 440 is disposed longitudinally rearward of the sunroof 120. The roof 440 may be made of, for example, laminated glass, a composite material, a metal (e.g., a steel), or another suitable type of material.

Figure 5:
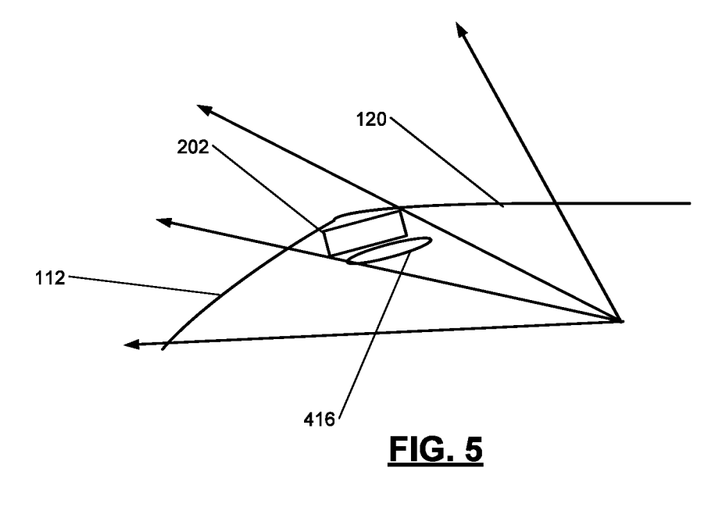
FIGS. 5 and 6 are a side perspective view and a top view of an example windshield and sunroof system.
Figure 6:
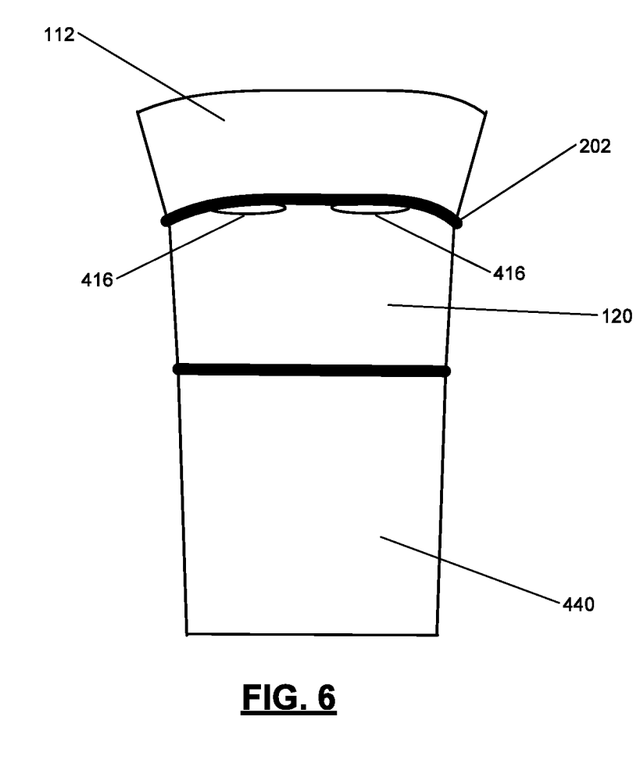

FIGS. 5 and 6 are a side perspective view and a top view of an example windshield and sunroof system. The system includes the smaller front cross-member 202. In this example, the sun visors 416 are stationary at least partially vertically under the front cross-member 202.

The sunroof 120 may be non-structural in this example and include laminated glass. One or more layers may be provided between the glass laminates. The sunroof 120 may include one or more electrochromic portions. The windshield 112 and the sunroof 120 may be adhered to the front cross-member 202 such as via the adhesive (e.g., as in the example of FIG. 2).

Figure 7:
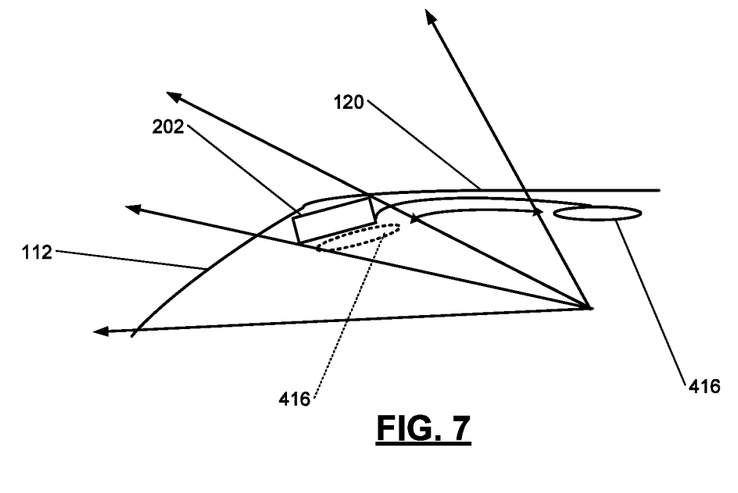
FIGS. 7 and 8 are a side perspective view and a top view of an example windshield and sunroof system.
Figure 8:
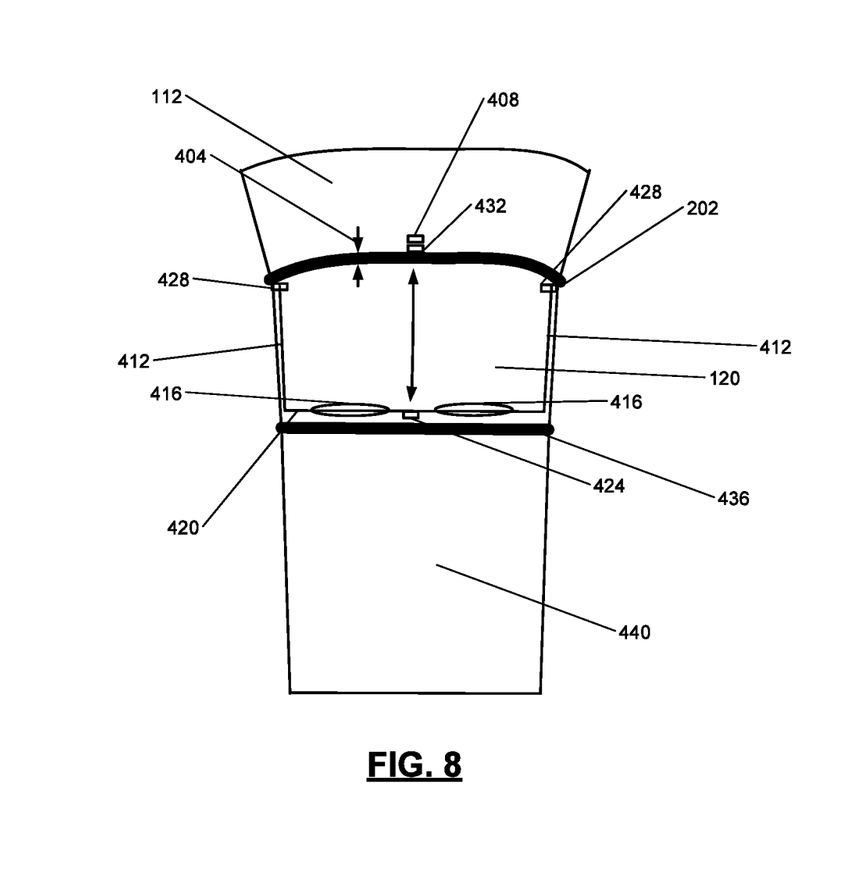

FIGS. 7 and 8 are a side perspective view and a top view of an example windshield and sunroof system. The system includes the smaller front cross-member 202. In this example, the sun visors 416 are translatable forward and rearward.

The windshield 112 includes laminated glass and may include one or more other layers as described above. The sunroof 120 may be non-structural and may include laminated glass and include one or more electrochromic portions. The sunroof 120 may be bonded to the front cross-member 202 and the rear cross-member 436 via the adhesive as discussed above. The rear cross-member 436 may be omitted or included. If included, the rear-cross-member 436 may be made of a composite material, a metal (e.g., a steel), or another suitable type of material. The roof 440 may be made of laminated glass, a composite material, a metal (e.g., steel) or another suitable material.

Figure 9:
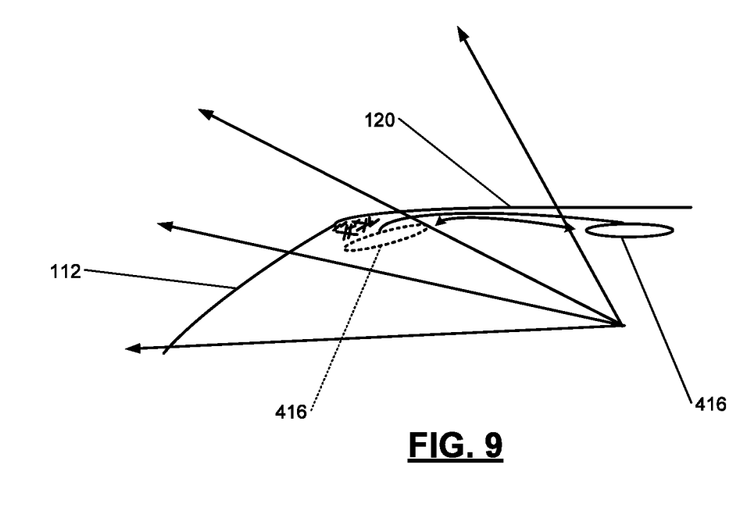
FIGS. 9 and 10 are a side perspective view and a top view of an example windshield and sunroof system.
Figure 10:
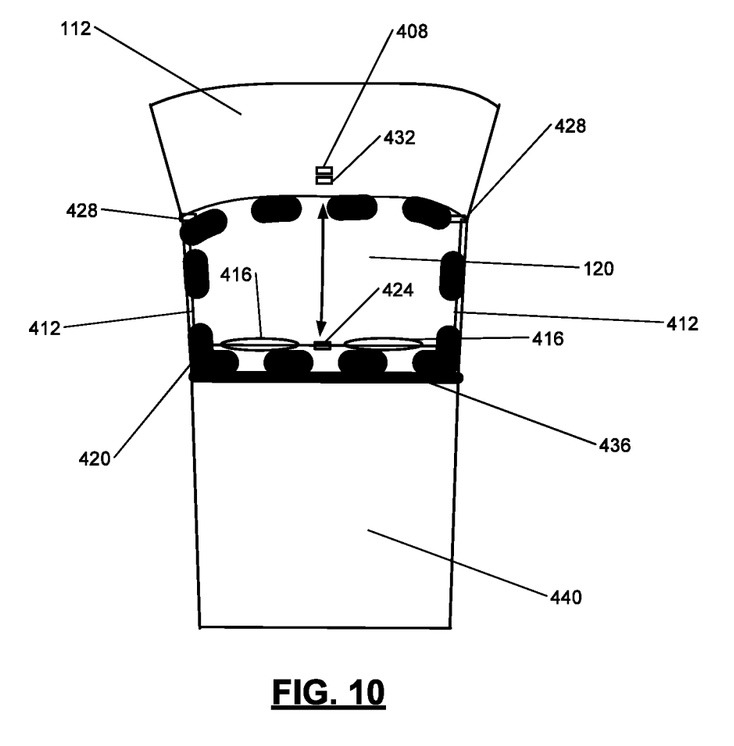

FIGS. 9 and 10 are a side perspective view and a top view of an example windshield and sunroof system. In this example, the front cross-member 202 is omitted. The sun visors 416 may be translatable forward and rearward or may be fixed.

The sunroof 120 is structurally bonded to the windshield 112 via a structural adhesive or a non-structural adhesive (e.g., the polyurethane adhesive discussed above). The structural adhesive used may have a higher modulus than the adhesive discussed above. The sunroof 120 may also be structurally bonded to the rear cross-member 436 and the roof rails (that extend longitudinally) via the structural adhesive or fastened to the rear cross-member 436, for example, using bolts. The sunroof 120 120 may be structurally bonded to the rear cross-member or non-structurally bonded (e.g., via the polyurethane adhesive) to the roof 440

The sunroof 120 may include one or more electrochromic portions. The sunroof 120 may be made of a structural transparent composite material (e.g., a transparent thermoset material or a transparent thermoplastic material). The sunroof 120 includes areas that include one or more types of reinforcement fibers, such as carbon fiber, glass fiber, basalt fiber, liquid crystal spun fiber (e.g., Kevlar), flax, or another suitable type of reinforcing fiber. In various implementations, the rear cross-member 436 may be omitted (e.g., due to the inclusion of the reinforcement fiber at the rear of the sunroof 120) or integrated with (e.g., embedded in) the sunroof 120. In various implementations, the reinforcement fiber may be included in the rigid plastic glazing.

In this example, the reinforcement fiber provides structure that allows the front cross-member 202 to be omitted. The removal of the front cross-member 202 increases forward visibility of the driver. In various implementations, the reinforcement fiber may be arranged in predetermined shapes (e.g., octagons, hexagons, squares, triangles, diamonds, etc.) to provide structure and for one or more aesthetics. The reinforcement fiber is illustrated in FIG. 10 by dashed lines. As illustrated, the reinforcement fiber extends around a periphery of the sunroof 120.

The above examples improve forward visibility of the driver and therefore raise a forward visibility score of the vehicle. The above may also decrease vehicle weight, which may increase fuel efficiency of the vehicle. The above may also decrease cost due to the smaller or omitted front cross-member 202. The sun visors 416 being translatable rearward may further increase forward visibility of the driver.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Per, Pascal, Curd, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual BasicD, Lua, MATLAB, SIMULINK, and Python®.

What is claimed is:

1. A windshield and roof system of a vehicle, comprising:
    a windshield that includes glass and that is transparent;
    a front cross-member that extends laterally between A-pillars of the vehicle, that is disposed rearward of the windshield, and that has a thickness in a longitudinal direction of the vehicle of less than 50 millimeters (mm);
    a roof portion that is transparent, that includes reinforcing fibers, and that is located rearward of the windshield,
    wherein the windshield and the roof portion are joined with the front cross-member;
    sun visors at least partially disposed vertically below the front cross-member;
    tracks that extend in a longitudinal direction of the vehicle, wherein the sun visors are configured to translate via the tracks;
    a lateral member that extends laterally,
    wherein the sun visors are fixed to the lateral member; and
    a handle coupled to the lateral member,
    wherein the reinforcing fibers include flax fibers.

2. The system of claim 1 wherein the roof portion includes electrochromic tinting at one or more locations, and
    wherein the system further includes a power control module that selectively applies power to the electrochromic tinting.

3. The system of claim 1 wherein the roof portion and the windshield are adhered to the front cross-member using an adhesive.

4. The system of claim 3 wherein the adhesive is polyurethane.

5. The system of claim 1 wherein the front cross-member is made of one of a metal and a composite material.

6. The system of claim 1 wherein at least one of the roof portion and the windshield is fixed to the front cross-member.

7. The system of claim 1 further comprising one or more electric motors configured to translate the sun visors along the tracks.

8. The system of claim 1 further comprising a rear cross-member that extends laterally between B-pillars of the vehicle, that is disposed at a rear end of the roof portion.

9. The system of claim 8 further comprising a roof that is disposed rearwardly of the rear cross-member.

10. The system of claim 9 wherein the roof portion includes one of glass, a metal, and a composite material.

11. The system of claim 1 wherein the roof portion includes one of glass and a composite material.

12. A windshield and roof system of a vehicle, comprising:
    a windshield that includes glass and that is transparent;
    a roof portion that is transparent, that is located rearward of the windshield, that includes reinforcing fibers, and that is joined with the roof portion,
    wherein the vehicle does not include a front cross-member that extends laterally between A-pillars of the vehicle and that is disposed between the windshield and the roof portion;
    sun visors;
    tracks that extend in a longitudinal direction of the vehicle, wherein the sun visors are configured to translate via the tracks;
a lateral member that extends laterally,
wherein the sun visors are fixed to the lateral member; and
a handle coupled to the lateral member,
wherein the reinforcing fibers include flax fibers.

13. The system of claim 12 wherein the roof portion includes electrochromic tinting at one or more locations, and
wherein the system further includes a power control module that selectively applies power to the electrochromic tinting.

14. The system of claim 12 wherein the roof portion is adhered to the windshield using an adhesive.

15. The system of claim 12 wherein the roof portion is made of a composite material.

* * * * *